United States Patent
Guddeti

(10) Patent No.: US 9,749,448 B2
(45) Date of Patent: Aug. 29, 2017

(54) HEADER PARITY ERROR HANDLING

(71) Applicant: Intel Corporation, Santa Clara, CA (US)

(72) Inventor: Jayakrishna Guddeti, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 151 days.

(21) Appl. No.: 14/553,692

(22) Filed: Nov. 25, 2014

(65) Prior Publication Data

US 2016/0147592 A1 May 26, 2016

(51) Int. Cl.
*H04L 1/18* (2006.01)
*H04L 29/06* (2006.01)
*H04L 1/00* (2006.01)

(52) U.S. Cl.
CPC ............ *H04L 69/22* (2013.01); *H04L 1/0056* (2013.01); *H04L 1/0082* (2013.01); *H04L 1/0061* (2013.01)

(58) Field of Classification Search
CPC ........ G06F 11/10; H04L 1/0056; H04L 69/22; H04L 1/0045; H04L 1/0063
See application file for complete search history.

(56) References Cited

U.S. PATENT DOCUMENTS

| | | | | |
|---|---|---|---|---|
| 6,408,416 B1 * | 6/2002 | Morley | ............ | G01B 31/31855 714/727 |
| 6,651,193 B1 * | 11/2003 | Dickey | ............... | G06F 11/0796 714/4.1 |
| 7,468,976 B2 * | 12/2008 | Wentink | ............ | H04L 29/12009 370/389 |
| 7,500,170 B2 * | 3/2009 | Wiatrowski | .......... | H03M 13/09 714/41 |
| 7,769,921 B2 * | 8/2010 | Hirayama | ............. | G06F 3/0613 361/600 |
| 7,792,014 B2 * | 9/2010 | Tsang | .................... | H04L 1/1874 370/216 |
| 8,255,560 B2 * | 8/2012 | Inoue | .................... | H04L 1/0072 709/232 |
| 8,281,203 B2 * | 10/2012 | Murakami | .......... | G06F 13/4282 714/748 |
| 8,799,550 B2 * | 8/2014 | Luk | ..................... | G06F 13/4282 370/469 |
| 2004/0225948 A1 | 11/2004 | Adkisson et al. | | |
| 2005/0141535 A1 | 6/2005 | Kuo et al. | | |
| 2010/0098101 A1 | 4/2010 | Drottar et al. | | |
| 2010/0306489 A1 | 12/2010 | Abts et al. | | |
| 2011/0064084 A1 | 3/2011 | Tatar et al. | | |

FOREIGN PATENT DOCUMENTS

WO    WO2016.085628    6/2016

OTHER PUBLICATIONS

International Search Report and Written Opinion in International Application No. PCT/US2015/058957 dated Feb. 17, 2016.

* cited by examiner

*Primary Examiner* — Esaw Abraham
(74) *Attorney, Agent, or Firm* — Patent Capital Group

(57) ABSTRACT

A parity error is detected in a header, where the header is in a particular one of a plurality of queues, the header is to include a plurality of fields, and each of the queues is to correspond to a respective transaction type. Fabricated header data is generated for one or more of the plurality of fields to indicate the parity error and replace data of one or more of the plurality of fields. An error containment mode is entered based on the parity error.

17 Claims, 11 Drawing Sheets

HEADER PARITY ERROR HANDLING

FIELD

This disclosure pertains to computing system, and in particular (but not exclusively) to error handling.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand increases for future processors to consume at even higher-rates corresponding demand is placed on the capabilities of existing interconnect architectures.

BRIEF DESCRIPTION OF THE DRAWINGS

Like reference numbers and designations in the various drawings indicate like elements.

DETAILED DESCRIPTION

Figure 1:
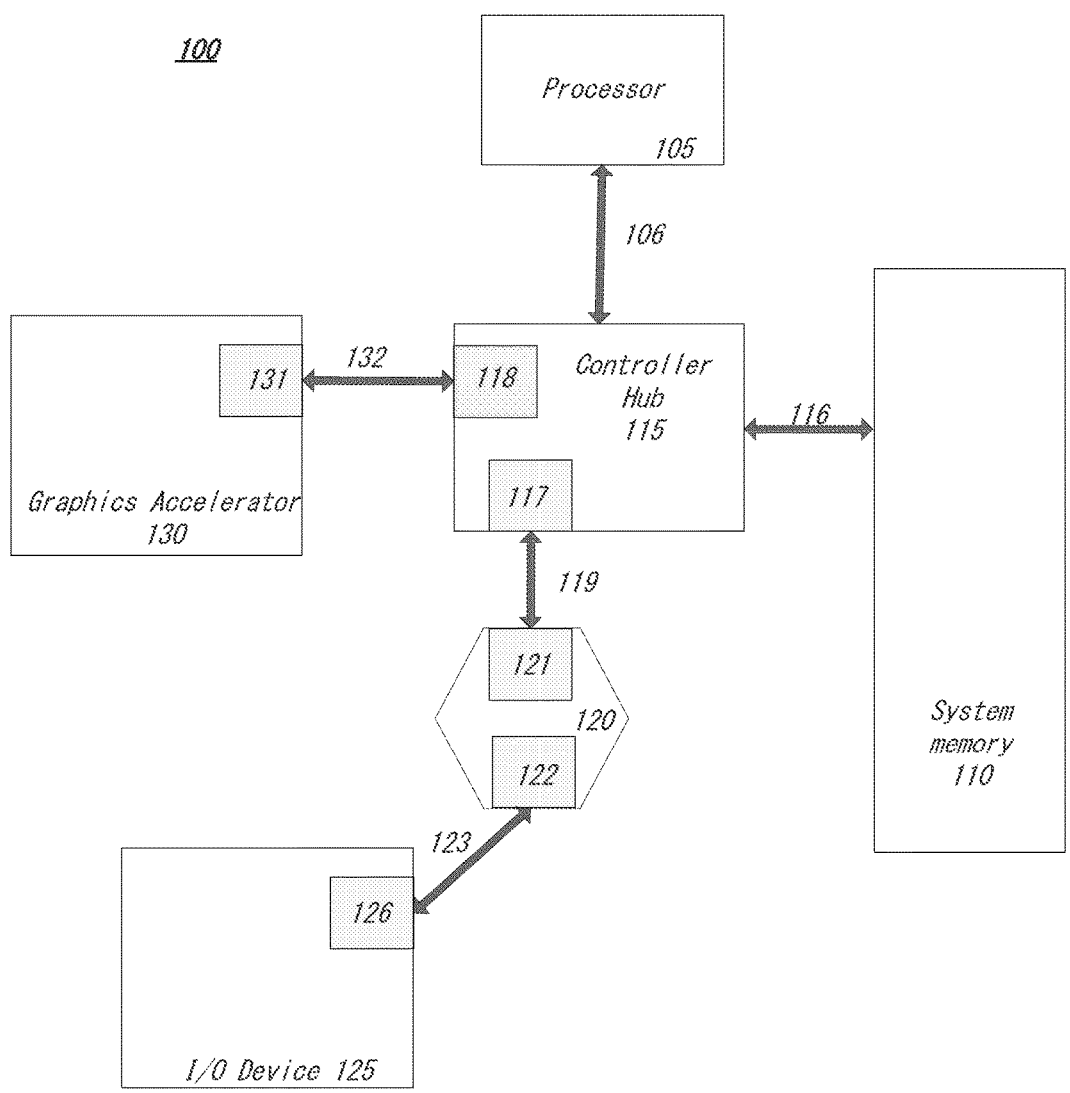
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115, such as a root hub or root complex, through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
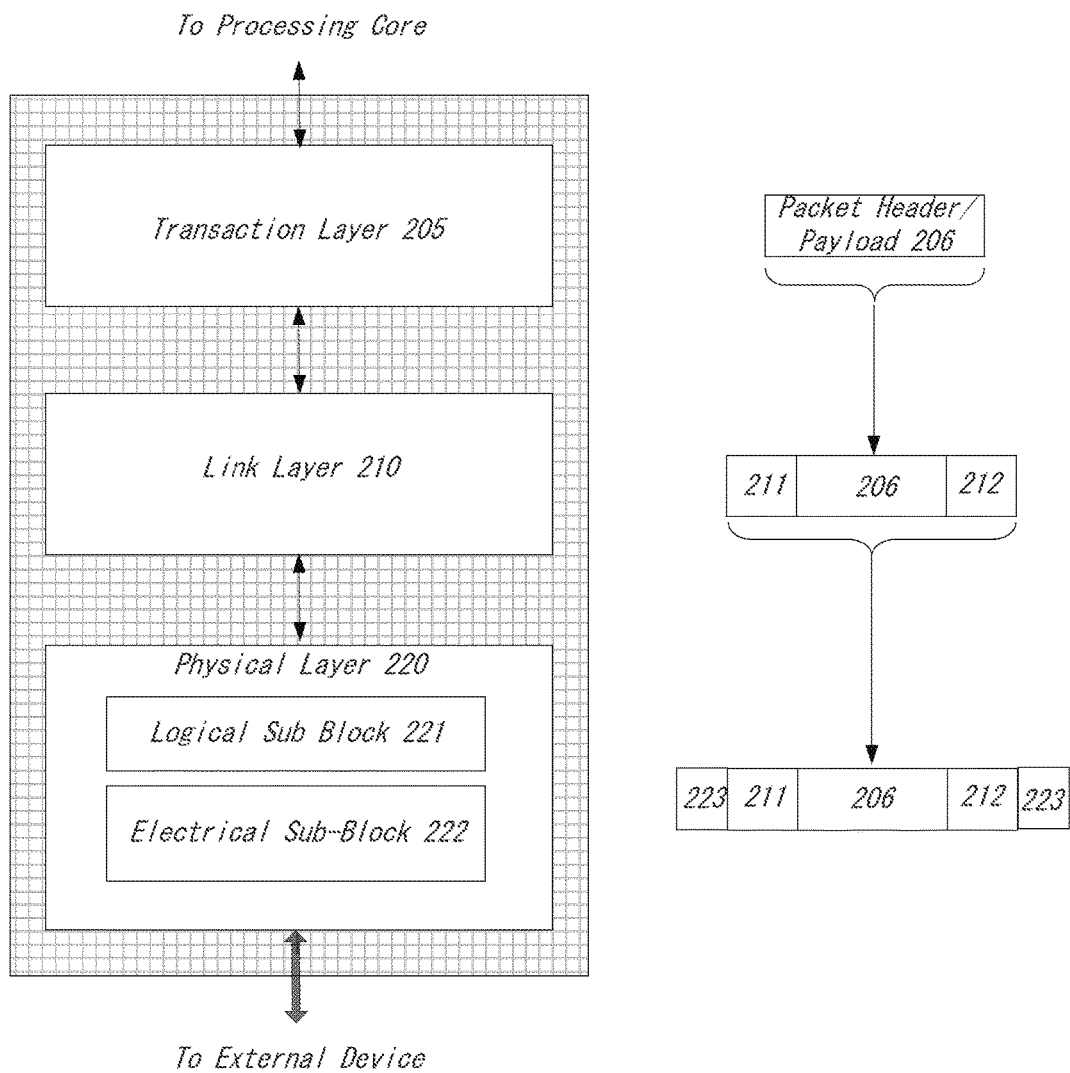
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. An example header packet format is illustrated, for instance, in FIG. 8. Other example packet headers/payloads can be formatted based on various protocol specifications, such as the header/payload formats found in the PCIe specification at the PCIe specification website.

Figure 3:
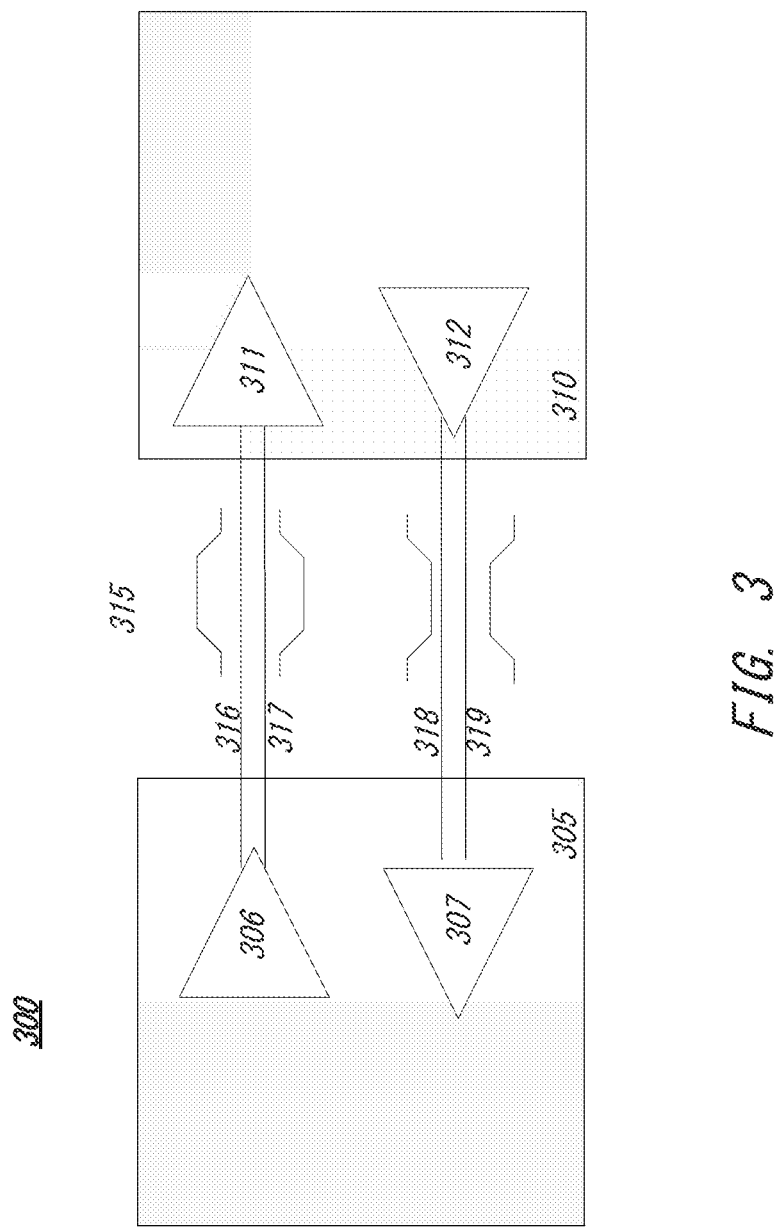
FIG. 3 illustrates an embodiment of a packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction.

Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
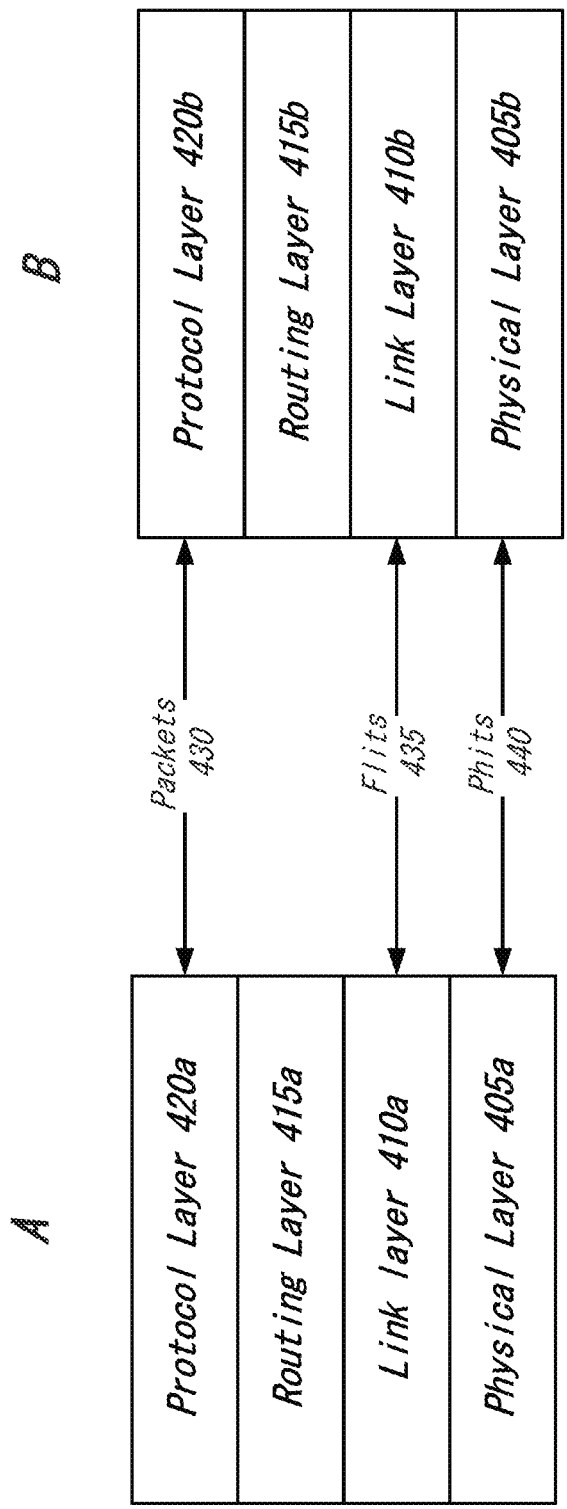
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Computing systems can be virtualized to allow multiple environments to be run on a single system. Virtualization performance has developed such that a server system implementing virtualization can result in large amount of idle capacity that can be used to maximize the computing resources of the server system. Virtualization, however, can introduce its own additional overhead, such as through the provision of a virtualization layer. Solutions have been sought to address this overhead. For instance, processor, chipset, I/O and interconnect enhancements have been developed toward this end to improve performance, efficiency, and robustness of virtualized platforms.

I/O virtualization solutions provide the same isolation that would be found if each environment running on a separate physical machine. Solutions also aim to provide near native performance for I/O operations. Isolation should provide separation of memory space. Isolation can separate I/O streams, interrupts, and (in the case of shared devices) the ability to isolate control operations, I/O operations and errors. In software sharing approaches, isolation can be enforced by a virtualization layer. For shared hardware devices where the virtualization layer is bypassed for I/O, other can be used to enforce isolation.

Figure 5:
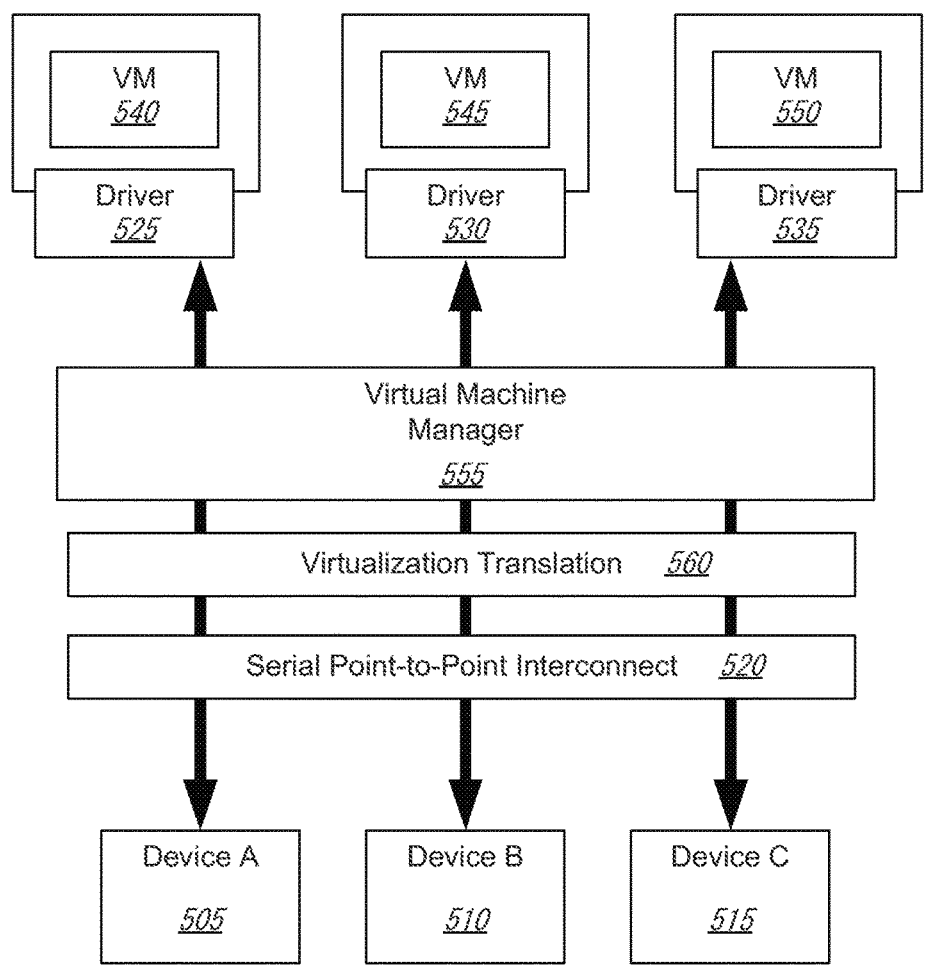
FIG. 5 illustrates an embodiment of a virtualization system.

In one example, illustrated in the simplified block diagram of FIG. 5, a system 500 can include one or more I/O devices 505, 510, 515 can connect through an interconnect 520 to guest drivers 525, 530, 535 hosted on virtual machines 540, 545, 550. A virtual machine manager (VMM) 555 can be provided to implement a virtual software-based switch to route packets to and from the appropriate virtual machines. An address translation layer 560 can be used to provide an interface between the interconnect 520 and the emulation layer of the VMM 555. In some cases, significant CPU overhead may be used by a virtual machine manager (VMM) to implement the virtual software-based switch, with this CPU overhead reducing the maximum throughput on an I/O device. In some instances, processing each packet through the software switch can utilize multiple CPU cycles. Accordingly, the I/O emulation layer of the VMM, in some implementations, can add overhead to I/O operations.

Virtualization address translation 560, such as Intel® VT-d technology, can facilitate memory translation and ensure protection of memory that enables a device to perform direct memory access (DMA) to/from host memory. Virtualization translation 560 can allow the I/O emulation layer of the VMM 555 to be bypassed, resulting in throughput improvement for virtual machines. In one implementation, address translation can allow a virtual machine to have direct access to a physical address (if so configured by the VMM). This can allow a device driver (e.g., 525, 530, 535) within a virtual machine (e.g., 540, 545, 550) to be able to write directly to registers of an IO device (e.g., 505, 510, 515). Similarly, virtualization translation 560 can write directly to memory space of a virtual machine, such as a DMA operation.

In some implementations, the VMM 555 utilizes and configures virtualization translation layer 560 to perform address translation when sending data to and from an I/O device (e.g., 505, 510, 515). The virtualization translation layer 560 can provide a hardware based mechanism to translate addresses for DMA transactions issued by I/O devices. In some cases, the address space seen by the guest operating system (OS) is not the same as the underlying physical address of the host machine. When a guest OS talks directly to an I/O device, it provides the Guest Physical Address (GPA) in the commands and buffer descriptors. The GPA is used by the I/O device when it issues the DMA transaction and is to be translated to a Host Physical Address (HPA) so that DMA transactions can target the underlying physical memory page that has been configured as the DMA buffer. Virtualization translation can utilize values in packets as an index to a lookup table that is created by the VMM. The field(s) can correspond to one of the directly assigned functions and identify the associated virtual machine. By identifying the virtual machine context and using the lookup tables, the chipset can translate the DMA address so that it targets the correct physical page and it can apply protection mechanisms to ensure that DMA operations cannot affect memory space of unrelated virtual machines, among other examples.

Header Parity Error Handling

Root complexes can used to implement massive storage structures to store header and payload data, along with very wide on-chip busses to transfer this information. To detect corruption of header or payload data, parity can be employed on these storage structures and busses. However, in the case of parity errors, in some systems, such as for a PCIe root complex, traditional implementations responds to header parity errors by either shutting down the root complex immediately or by simply reporting the error to software. Header parity errors can represent a fatal error and traditional implementations either risk allowing persistent storage to be corrupted because of errors in a header and/or cause an entire system to go down abruptly. Both these scenarios are unacceptable in many applications, such as data centers. In some implementations, solutions can be provided, such as those described herein, that enable a root complex to achieve both error containment and graceful shutdown of system.

Figure 6:
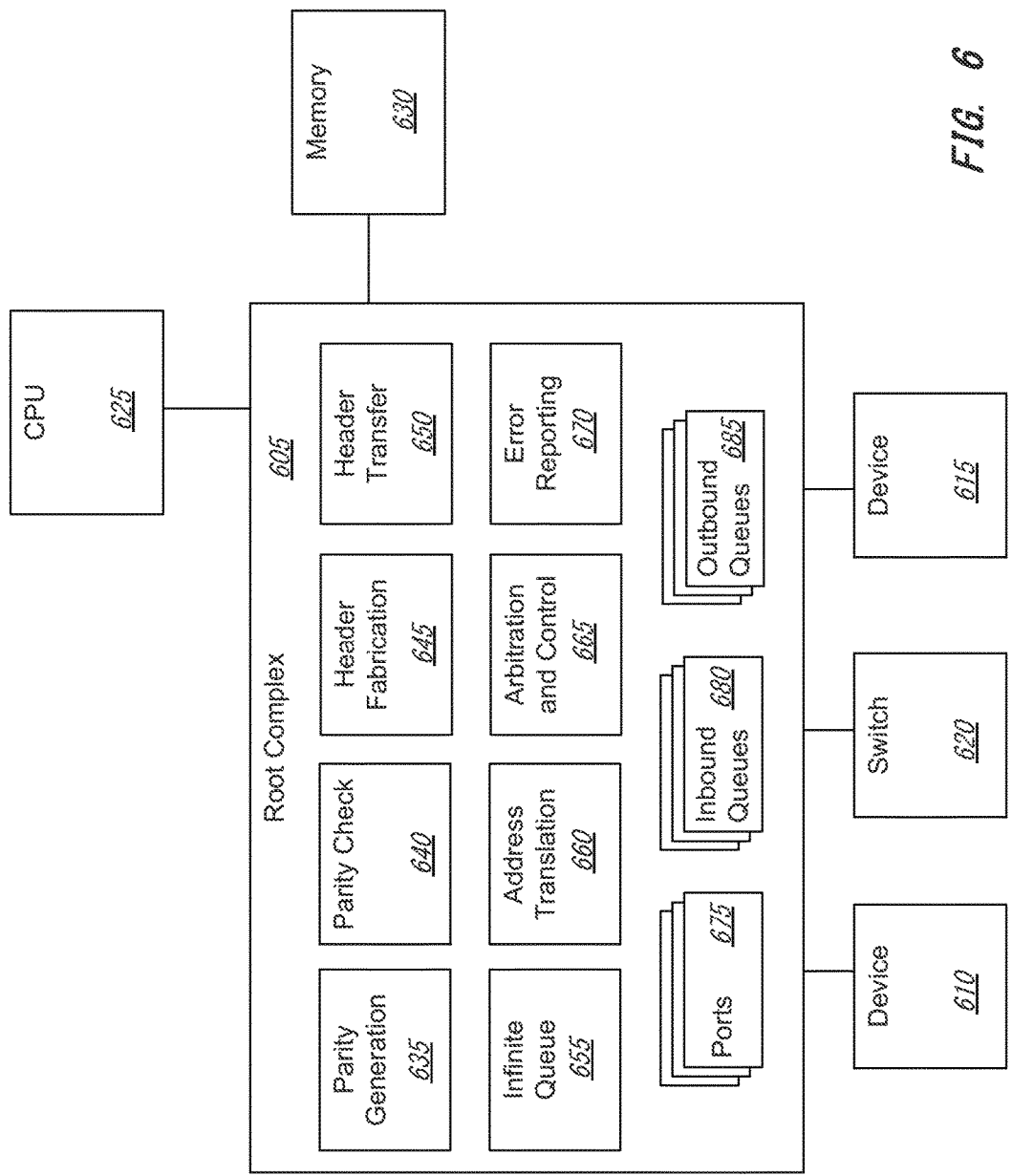
FIG. 6 is a simplified block diagram of a root complex.

Turning to FIG. 6, a simplified block diagram is shown of a portion of a computing environment 600, including a root complex 605, I/O devices 610, 615, one or more switches 620, a CPU 625, and related memory element(s) 630. In some implementations, the root complex 605 can be implemented in connection with a virtualization system. In the present example, root complex 605 can include additional components implementing logic to assist in detecting and handling parity errors affecting packet headers and data. For instance, as shown in the example of FIG. 6, root complex 605 can include parity generation logic 635 and parity check logic 640 as well as logic responsive to identified parity errors, such as header fabrication logic 645, header transfer logic 650, infinite queue logic 655, and error reporting logic 670. Further components can include, for example, address translation capabilities (including for virtualization translation), arbitration and control logic, a plurality of inbound queues 680 (e.g., for a plurality of transaction types), a plurality of outbound queues 685, and one or more ports over which the root complex can communicate with other devices.

Parity errors can be detected using parity checking 640 and parity generation logic 635, including parity errors affecting headers of packets as the header data resides in queues 680, 685 of the root complex 605. To achieve a high degree of error containment while avoiding block or hang conditions, header fabrication module 645 can generate "dummy" header data replacing one or more fields of the header for which a parity error was found. The dummy header data can be based on different constraints and allow for the header to be processed without fatal errors resulting. For instance, header transfer logic 650 can interpret the dummy header and identify, from at least some of the fabricated fields, that the header is, indeed, a dummy header generated in response to a parity error. The header transfer logic 650 can then perform actions to contain the error and mitigate against any other transactions being blocked. Queues storing payload data associated with the header (and other headers in the queues 680, 685) can also be managed during an abort mode entered through the identification of the dummy header, for instance, using infinite queue module 650. The infinite queue module can cause payload queues to autonomously return credits to allow forward progress of packets and sync/ignore new data coming into the queue. Additionally, error reporting 670 can be configured such that unnecessary error escalation is avoided (e.g., based on errors detected from other devices and components of the system that receive a dummy header and respond to the fabricated fields of the dummy header with additional errors), while still logging parity errors detected at the root complex 605. While traditional systems may respond to header errors with intentional or unintentional hangs, root complexes with functionality such as that shown and described in the example of FIG. 6, cam achiever strong error containment while enabling graceful shutdown of the system (e.g., by intelligently avoiding hang conditions in other subsystems).

Figure 7:
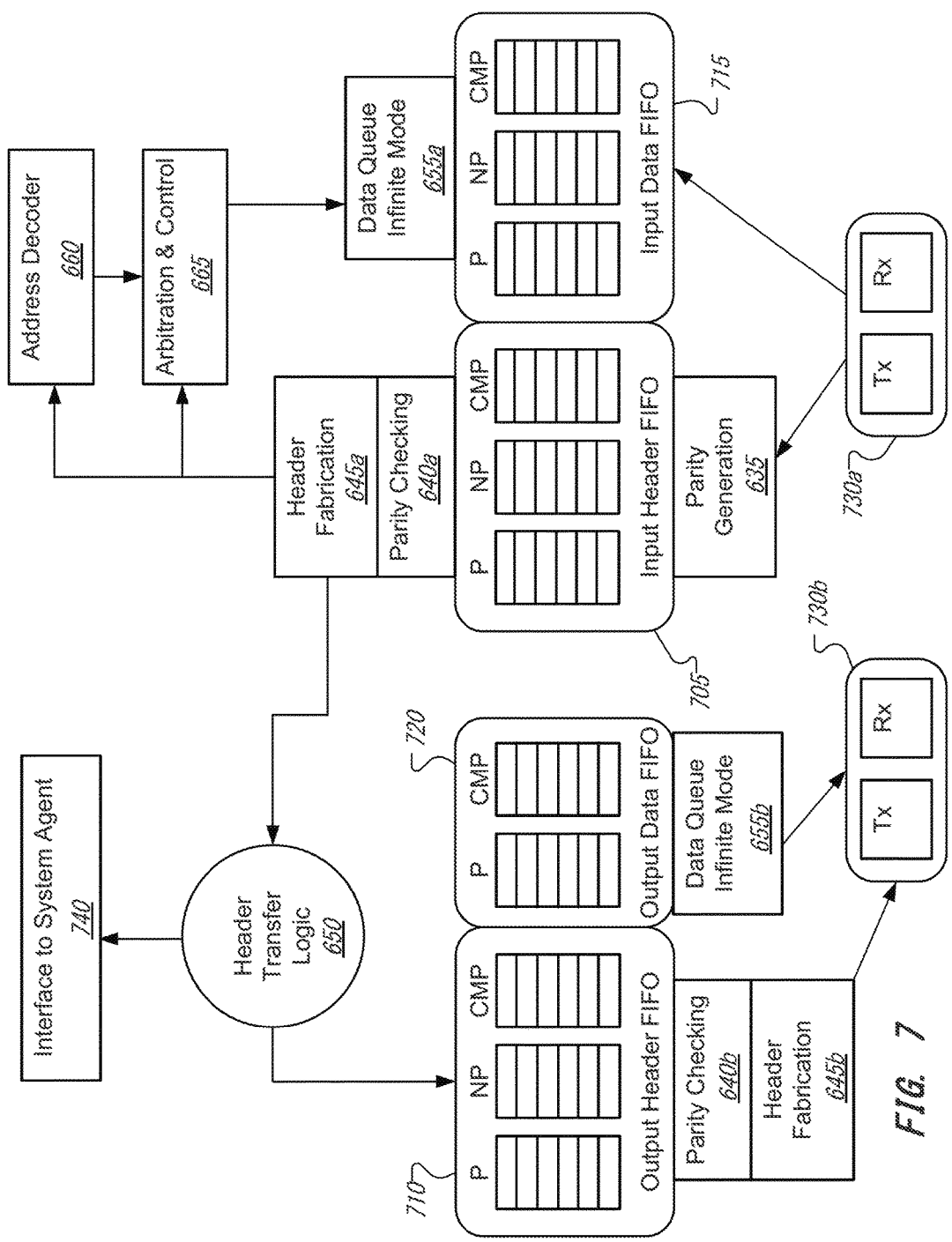
FIG. 7 is a block diagram representing handling of a header parity error in accordance with at least one embodiment.

FIG. 7 illustrates a more detailed view of a system employing a root complex with components such as parity generation logic 635, parity checking 640*a-b*, header fabrication logic 645*a-b*, infinite queue modules 655*a-b*, arbitration and control logic 665, address translation logic 660, and header transfer logic 650. Queues 705, 710, 715, 720 can be provided, including first-in, first-out (FIFO) input queues 705, 715 and output queues 710, 720. Separate queues can be provided for headers (e.g., 705, 710) and their respective payload data (e.g., 715, 720). Further, multiple queues can be provided for each of the input and output header queues and the input and output payload (or "data") queues based on the type of transaction of the packet (and its header and data). For instance, in one example, FIG. 7 represents components of a PCIe root complex and input queues can include header queues 705, 710 for posted (P) and non-posted (NP) transactions and completions (CMP). Similar type-specific queues can provided for data queues 715, 720 (although in this example a non-posted data queue is only provided for inputs (e.g., as no data may be needed to be output in response to a non-posted request).

The example of FIG. 7 further represents example flows between components of a system. For instance, a packet can be received, at the root complex, over a PCIe port from a device (e.g., 730*a*). Before placing the header of the packet in queue 705, a parity value can be calculated for the header data (e.g., through an XOR operation on the header data) by parity generation logic 635 and can be associated with the header in the queue 705. Payload of the data can be deposited in input data queue 715. (In some cases, parity can also be generated for the payload to detect similar errors that may develop as the payload data waits in queue 715.) One or more fields of the header can indicate a transaction type of the header's packet and the header can be deposited in the input header queue associated with the detected transaction type. For instance, if the header is identified as associated with a non-posted transaction, the header can be placed in a non-posted input header queue. Fields of the header, when received by the root complex, can be assumed to be error-free, for instance, based on transaction layer error protection measures (e.g., cyclical redundancy check (CRC)) used to guard corrupted data entering the root complex.

In some implementations, there may be multiple stages of data queues within a root complex before a packet is actually processed, in which case each stage of should be able to uniquely identify the corresponding packet type. Such stages can include address translation (e.g., in connection with a virtualized computing environment), decoding to determine the packet's destination, pre-fetching to gain ownership of cache lines from coherent memory, and other transaction and operations. This can be accomplished based on the original header queue assignment (e.g., if the header was originally assigned to a posted, non-posted, or completion queue, etc.). Errors can occur, however, corrupting the fields of the header that are intended to be used to identify the transaction type of the header. For instance, during a lifespan of the header data, it may be read and accessed multiple times in the various stages of packet processing allowing some data corruption to potentially occur.

As introduced above, parity of a header can be checked (after or between these stages) to identify whether the header data has been corrupted. The parity check can involve recalculating the parity value and comparing it against the previously generated parity value for the header. When a header parity error is identified, one or more ports of the root complex can be placed in a special parity error containment mode. In some instance, the header with the error can be mapped to a particular port and the particular port can be the one placed in parity error containment mode. The system, or the one or more affected ports, may remain in error containment mode until the system is rebooted. The aim of the mode can be to guard against other transaction being hung or blocked and that no timeouts occur. Further, error logging and reporting logic (e.g., 670) can report the detected parity error as a fatal error to an operating system of the system, for instance, by raising an interrupt or using another technique. The operating system can then take action on the parity error, for instance, by stopping the device drivers on the port(s) on which the parity error was seen (e.g., to avoid stressing the erroneous port) and gracefully completing the ongoing tasks and issuing reboot.

Figure 8:
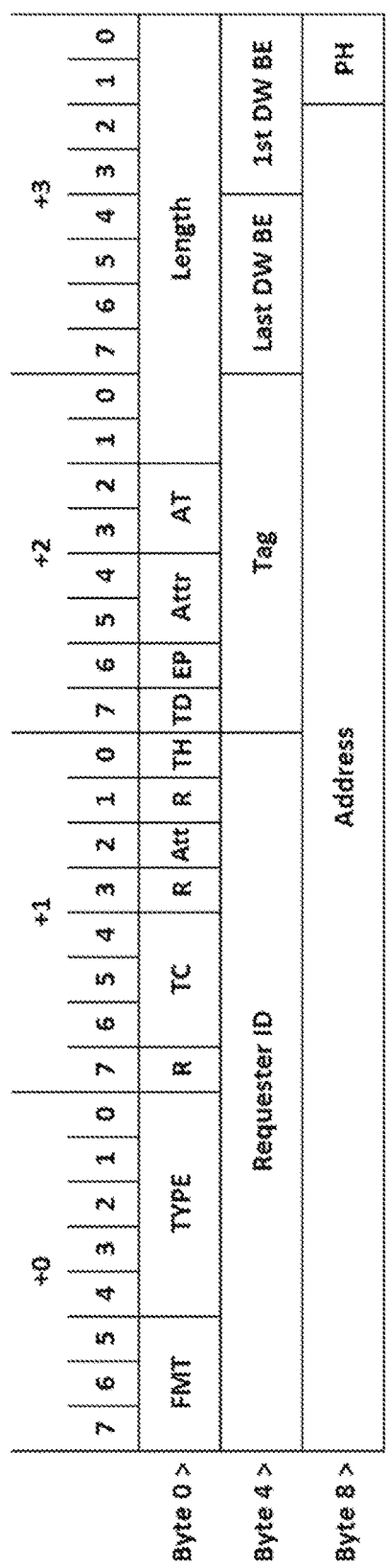
FIG. 8 is a block diagram of an example packet header.

In some cases, when a header parity error triggers entry into parity error containment mode, header fabrication logic can be accessed to fabricate new fields for the header in which the error is found to replace those fields that, when corrupted and allowed to be proceed, could cause catastrophic errors within the system. FIG. 8 shows an example packet header format for transaction layer packets (TLPs) within PCIe. Further, using PCIe as an example, Table 1 summarizes the purposes of some of the header fields of a PCIe header and further summarizes the impact of parity error in these fields. Table 1 further summarizes the types of dummy header data that can be fabricated to replace the original header fields. In some implementations, it is impossible to identify, from a parity error, which of the fields of the header have actually be corrupted. In some cases, a parity check can only identify that an error has occurred and not what fields were affected. Accordingly, in such instances, multiple header fields (including fields not affected by the error) can be replaced with the dummy data.

ing hardcoding the Type and Format fields to ensure that they are consistent with the transaction type of the header's queue. Given the possibility that any of the fields may contain the error, none of the field values are trusted. For instance, the length of the payload of the packet is unknown as an error may exist in the Length field of the packet. Accordingly, the dummy data may include Type and Format fields encoded with "MemWrite" (given that the header was from the Posted input queue) and the length field can also be hardcoded to an arbitrary constant value, such as length value corresponding to a single cache line. In one example, transaction abort logic ignores address and length fields, so these fields can be encoded with pre-defined dummy values, including values that are set only when the header parity error occurs (i.e., such that header parity errors and corresponding fabricated dummy headers can be identified from

TABLE 1

| TLP Field | Purpose | Impact of parity error | Fabricated header value |
| --- | --- | --- | --- |
| Format; Type | Identify if the packet is a write, read, completion, etc. | Obfuscates the transaction type of the packet | Hardcode write, read, completion type based on the transaction type (e.g., P, NP, CMP) to which the header's respective queue is associated |
| Length | Length of data associated with the packet header | Can cause (payload) data corruption and integrity issues (e.g., underflow) in the data queues | Field is hardcoded with a constant value that will be ignored by hardware and indicate that (payload) data queues are to be placed infinite availability mode |
| Address | Address for reads and writes | Can corrupt data in some other address location for writes and return data for read from incorrect address location | Field is hardcoded with a constant value (e.g., all 1's) that does not fall within the system address space (and cannot be mistaken for a legitimate system address). The defined constant value is to be ignored by address decode (or "translation") logic within the root complex (i.e., the fabricated address value can indicate that the header has been fabricated because of a detected parity error) |
| Requester ID; Tag | Identifies completions for corresponding reads | Device originating the read request to root complex cannot correlate completions | Both fields can retain their original values. While this may cause unexpected data to be sent to a device (and cause errors to be flagged at the device), these errors can be deescalated during error containment mode |
| Byte enables | Identifies the active bytes in a double word | Can result in illegal values for byte enables causing hardware to malperform and/or payload data to be corrupted | Set value of each data enable field to 0xF |
| EP | Indicates poisoned data payload | Can result in data being forwarded even when poisoned | Set value to 0 (fabricated headers are to be handled under master abort) |

As an illustrative example, a parity error can be detected for a particular header in a posted input header queue. The exact field affected by the error may be unknown, so the root complex logic is configured to address the possibility that any one of the header fields may be affected. In response to detecting the parity error, one or more ports of the root complex can be put into parity error containment mode and header fabrication logic 645a can be triggered. The header fabrication logic can generate dummy header fields includthe predefined field values). Thus, the dummy encodings can be read by other abort and control logic to cause the system to enter parity error containment mode and the dummy value can be further identified by decoding logic (e.g., 660) such that it bypasses decoding. Failure to substitute an erroneous address field can cause faults in address decoding and cause spurious errors, which may bring down the system abruptly.

Errors in other fields may pose lesser risks such that the root complex can handle errors that result from the erroneous fields. Accordingly, header fabrication logic (e.g., 645*a*) can effectively use the original header values in some cases, even if they do contain the error. As an example, Requester ID and Tag values can be re-encoded in the dummy header fields generated by header fabrication logic. Requester ID and Tag fields of PCIe headers have important uses, for instance, in the case of non-posted transactions. These fields allow the requester to co-relate a completion with a corresponding read request. As noted above, in some implementations, a parity error in either of these fields can be retained in the dummy header as header fabrication logic keeps the same value readout from the header queue. As a consequence, in some examples, if the error happened within either of these two fields, the incorrect Requester ID and Tag will be sent to the originating device. However, transaction abort logic of the root complex (e.g., parity check logic) can be configured to recognize that the header includes a parity error and can generate a completion with "Un-supported Request" response set in the PCIe header. As the originating device tries to map the completion with its outstanding requests and fails (i.e., because of the incorrect requester ID and Tag), the originating device can raise its own error or interrupt. However, as parity error containment mode has been entered, error handling logic at the root port can suppress error reporting from other devices below/downstream from it, and block the escalation of any resulting spurious errors.

Additional logic can be provided in the example root complex shown and described in FIG. 7. For instance, header transfer logic 650 can be provided to read the headers of the input header and data queues (e.g., 705, 715) and process the headers (both original (i.e., error-free) and dummy headers) such that the headers (and corresponding payloads) are directed to their appropriate destinations (such as another port or a system agent (e.g., 740), etc.).

It should be appreciated that the principles, operations, and features described in connection with the examples above relating to header parity errors detected at an input header queue (e.g., 705) can apply essentially equally to header parity errors detected at output queues (e.g., 710). As an exception, when packets are received at input queues, the root complex can utilize address decoding logic for the input headers to determine the destination of the header. However, in the case of output queues (e.g., 710, 720) some other port or system agent has already decoded the destination of the header and sent the packet to the corresponding output queue. Accordingly, packets and headers in output queues can be simply sent from the queue (e.g., after any error handling) to the downstream device connected to the corresponding port.

Figure 9:
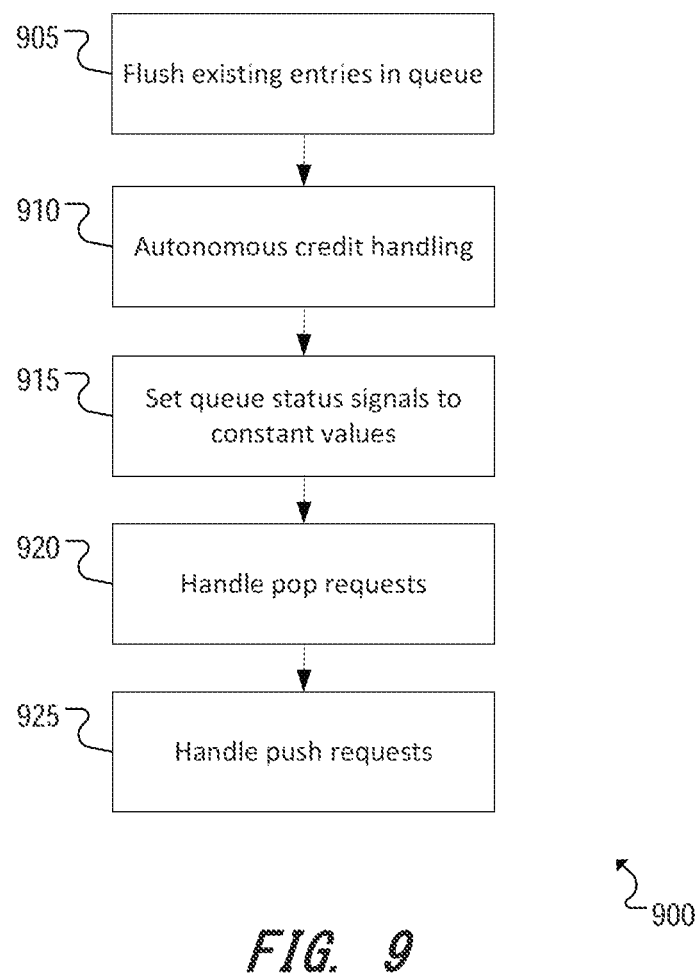
FIG. 9 is a simplified flow diagram illustrating an error containment mode.

When error containment mode is entered based on header parity errors (either at the input header queue 705 or output header queue 710, data queue infinite mode logic (e.g., 655*a, b*) can be triggered to prevent transactions from hanging due to the dummy data provided in the Length field or other fields dictating the character of the payload data stored in the data queue (e.g., 715, 720). In one example, as shown in the flow diagram 900 of FIG. 9, queue infinite mode can first flush (or reset) 905 all existing entries in the corresponding data queue. For instance, once parity logic reports a header parity error, all of the data queues in that particular port can reset their respective pointers to empty condition. For instance, the data queue corresponding to the packet type on which the parity error can be flushed. In other instances, all data queues (both input and output) of a particular port where parity error was detected may be flushed. This can guard against subsequent parity errors (e.g., related to other packet types).

Further, infinite queue mode can provide autonomous credit handling 910. For instance, infinite queue logic can cause the number of entries/credits in the data queue at the time of the parity error to be counted. These credits can then all be returned to the other side of the bus. As all of the data queue entries have been reset (i.e., in 905), the corresponding credit information has also been lost. Returning the credits allows transactions to continue to be received as the system resets without additional errors being thrown. Further, autonomous credit handling 910 can provide, in addition to the initial credit return responsive to the header parity error, handling of credit returns for any "Push" data for new packets received at the root complex following the header parity error.

In addition to autonomous credit handling 910, infinite queue mode logic can additionally cause queue status signals to be set 915 to constant values to guarantee continued forward progress of any subsequent transactions until graceful shutdown of the system is completed. For instance, infinite queue mode logic can preemptively report queue status values to the rest of the system logic dependent on the data queue's state for continued forward progress. For instance, when in queue infinite mode, the status for that queue can be autonomously set to continuously show the queue status as both "not empty" and "not full". For instance, a "Queue Empty" (or "FIFO Empty") status value can be automatically de-asserted and indicate that at least one cache line is available for reading. Additionally, a "Queue Full" (or "FIFO Full") status can also be de-asserted and set to indicate that a maximum number of entries are available for writing.

Infinite queue mode can further include the handling of pop requests 920. For instance, as header fabrication logic hardcoded data payload size to one (or another arbitrary number) cache line, each header will attempt to pop one cache line size of data (or move the read pointer to the next entry of the queue), irrespective of the original size of data for that particular packet. Infinite queue mode can handle this by avoiding popping data from the data queue. Instead, in the event of a pop attempt, infinite queue mode logic can block the pop, but trick the requester by fabricating an indication of a successful pop and returning a constant value on the data bus. For instance, a successful pop can be indicated by indicating "data available" on the read data bus (e.g., using a defined encoding such as a constant value read out as all 1's for the entire size of data). In the case of a master abort, however, data can be read out from the queue and then dropped (i.e., rather than used).

Push requests can also be handled 925 by infinite queue mode logic. Subsequent transactions arriving at the root complex after the header parity error event can try to push data into the data queue. Infinite queue mode logic can intervene to block (or immediately discard) the data attempted to be pushed and can "trick" the originator of the data into thinking that the push was successful by fabricating a corresponding number of credits corresponding to the data received. For instance, autonomous data credit handling logic of the infinite queue mode logic can count the number of credits corresponding to the data attempted to be pushed and cause these credits to be automatically returned to the originator of the transaction.

As discussed above, dummy header data can be identified by abort logic at the root complex and cause error containment to begin. Further, errors can be identified at various stages/phases of processing. Abort logic of the root complex can perform different functions based on when (i.e., at or before which phase (e.g., decode, pre-fetch and commit)) the parity error occurred. As an example, if the header parity error occurs on or before the decode phase, upon detection of the parity error, the address decode or translation logic can decode the transaction to "master abort" (or another abort mode) irrespective of the type and destination of the transaction. If the header parity error occurs, instead, on or before prefetch but after decode, it is possible that a particular transaction may have completed decode phase when parity error was detected. In this case, abort logic can ignore the target destination (obtained in the decode phase) and enter a self-peer-to-peer (SPP) with "master abort" type mode. In other words, a dummy pre-fetch can be performed to advance the prefetch pipeline to the next transaction, for instance, by moving pre-fetch pointers to the next entry. Finally, if the header parity error is detected on or before a commit stage (e.g., used to update memory and/or present the latest copy of the line to rest of the system) and after pre-fetch, for transactions to coherent memory found to possess a header parity error, ownership may have been obtained and coherency interface logic may have the latest copy of the cache line (e.g., corresponding to the transaction). However, due to the parity error, abort logic can refuse to process the "commit" phase and can instead perform a "master abort" of the commit phase. A master abort can happen in any of the phases or stages of processing resulting in the abortion of the phase based on a detected header parity error. A master abort during the commit phase can cause the header to pop from the header queue. However, coherency logic may still keep the corresponding cache line. In this scenario, the cache line can be written back or given to another coherent agent (e.g., if a snoop is received for the corresponding cache line). If the transaction is for another I/O device, no action may be taken in the prefetch phase and, therefore, master aborting the "commit" phase may be sufficient.

In the event of a header parity error, error and reporting logic can be provided that logs a special uncorrectable, fatal error for the detected parity error (e.g., on per root port basis). In a particular implementation, corresponding error logic can be provided to trigger an interrupt (or other action) to escalate and/or report the error to the processing core and inform the core (and operating system) of this particular error.

As noted above, dummy header data, when it is returned to other devices, can cause other errors to be thrown. Error logging and reporting logic can further include functionality for filtering errors occurring after parity error containment mode has been entered. For instance, errors may be escalated from I/O devices below the root complex, because of some erroneous fields in the packets sent to devices. Error filtering logic can allow explicit error messages to be filtered from the downstream port of the root complex (e.g., filter PCIe error messages (FATAL, NONFATAL and CORR)) and/or filter any interrupts from the I/O devices from downstream ports to avoid error escalation directly from devices, among other potential filtering actions.

Figure 10:
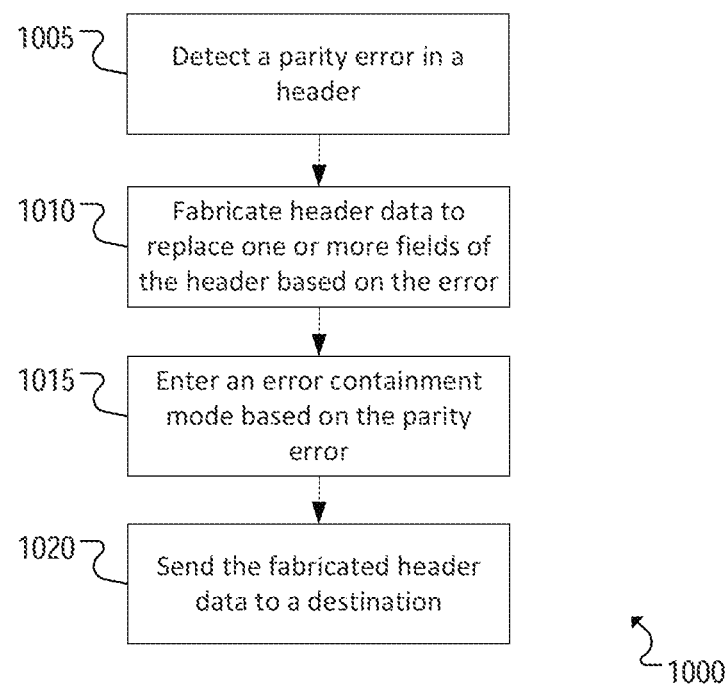
FIG. 10 is simplified flow diagram representing one or more techniques for handling a header parity error.

Turning to FIG. 10, a flowchart 1000 is shown illustrating techniques for handling a header parity error in accordance with at least some implementations. For instance, parity detection logic can detect 1005 a parity error in a header included in an input or output queue of a root port or other system component. Dummy header data can be fabricated 1010 to replace one or more (or all) fields of the header in which the parity error was found. An error containment mode can be entered 1015 in response to detecting the parity error and the error containment mode can be configured to permit graceful shutdown of the system. In connection with this error containment, the fabricated header data can be sent to a destination (e.g., indicated in an address field of the dummy header). Error containment can handle and mitigate any residual errors resulting from the dummy fields of the fabricated header.

It should be noted that while much of the above principles and examples are described within the context of PCIe and particular revisions of the PCIe specification, the principles, solutions, and features described herein can be equally applicable to other protocols and systems. Further, note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 11:
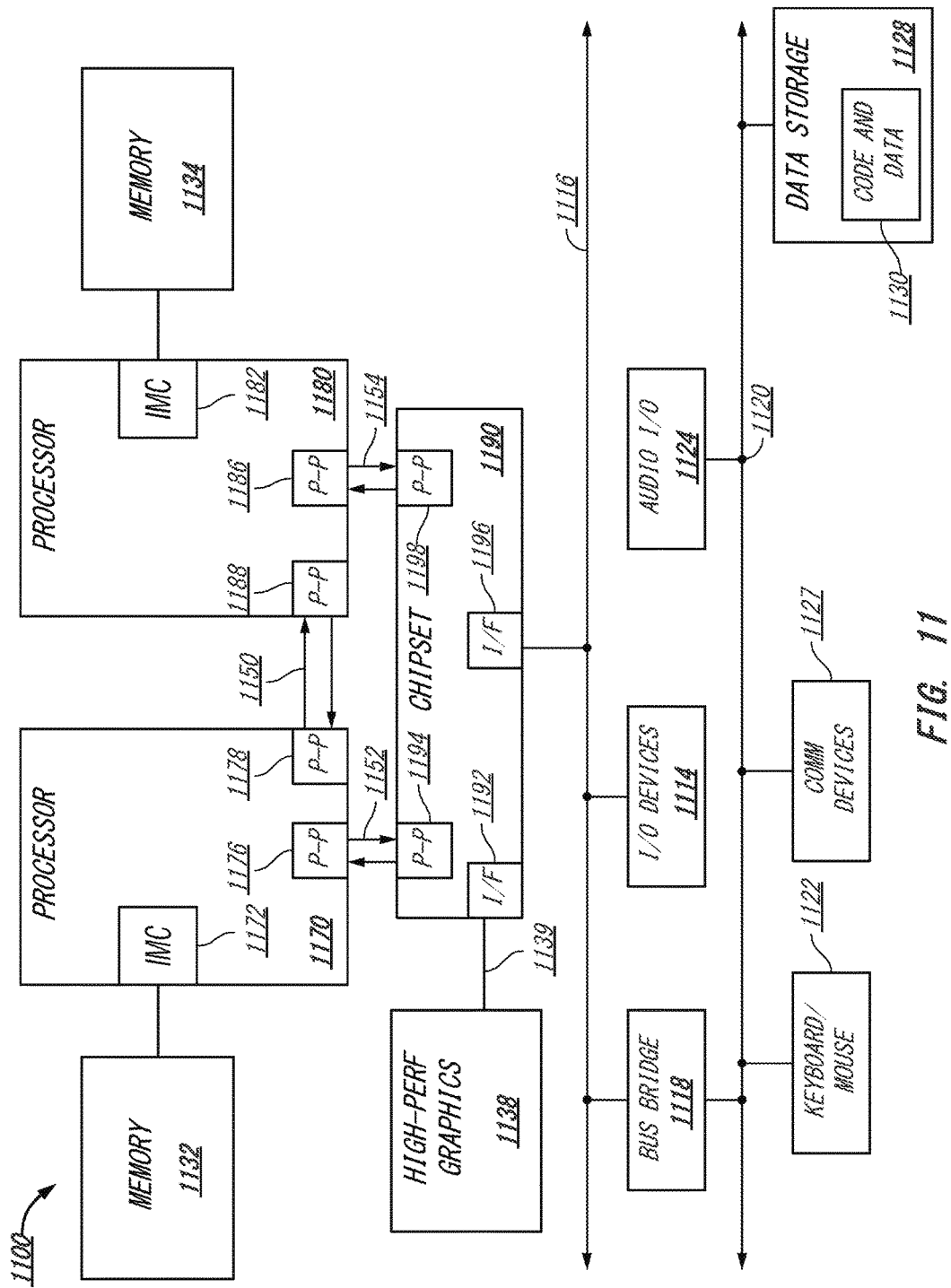
FIG. 11 illustrates an embodiment of a block for a computing system including multiple processors.

Referring to FIG. 11, an embodiment of a block diagram for a computing system 1100 including a multiprocessor system is depicted. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of a processor. In one embodiment, 1152 and 1154 are part of a serial, point-to-point coherent interconnect fabric, such as a high-performance architecture.

While shown with only two processors 1170, 1180, it is to be understood that the scope of the present invention is not so limited. In other embodiments, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 each exchange information with a chipset 1190 via individual P-P interfaces 1152, 1154 using point to point interface circuits 1176, 1194, 1186, 1198. Chipset 1190 also exchanges information with a high-performance graphics circuit 1138 via an interface circuit 1192 along a high-performance graphics interconnect 1139.

A shared cache (not shown) may be included in either processor or outside of both processors; yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 are coupled to first bus 1116, along with a bus bridge 1118 which couples first bus 1116 to a second bus 1120. In one embodiment, second bus 1120 includes a low pin count (LPC) bus. Various devices are coupled to second bus 1120 including, for example, a keyboard and/or mouse 1122, communication devices 1127 and a storage unit 1128 such as a disk drive or other mass storage device which often includes instructions/code and data 1130, in one embodiment. Further, an audio I/O 1124 is shown coupled to second bus 1120. Note that other architectures are possible, where the included components and interconnect architectures vary. For example, instead of the point-to-point architecture of FIG. 11, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, hardware- and/or software-based logic, and a method to detect a parity error in a header, where the header is in a particular one of a plurality of queues, the header is to include a plurality of fields, and each of the queues is to correspond to a respective transaction type. Additionally, fabricated header data can be generated for one or more of the plurality of fields to indicate the parity error and replace data of one or more of the plurality of fields, and an error containment mode can be entered based on the parity error.

In one example, at least a particular one of the fields is to be encoded with the fabricated header data to prevent an illegal value in the particular field.

In one example, the illegal value results from the parity error corrupting a value of the particular field.

In one example, the header includes a header of a transaction layer packet.

In one example, the plurality of fields includes a format field, a type field, a length field, an address field, a requester identifier field, and a tag field.

In one example, the fabricated header data includes: for the format and type fields, values corresponding to a transaction type of the particular queue; for the length field, a first constant value; and for the address field, a second constant value outside of system address space, where values of the requester identifier field and the tag field are to be retained.

In one example, the parity error is to be identified based on the second constant value.

In one example, the plurality of fields further includes a byte enable field and an error/poisoned field. The fabricated header data can include, for the byte enable field, a third constant value, and for the error/poisoned field, a false value.

In one example, the fabricated header data is to maintain a value of at least a particular one of the plurality of fields.

In one example, a filter prevents escalation of errors resulting from fabricated header data in the particular field triggering an error at a downstream I/O device.

In one example, the particular queue includes a header queue and, during the error containment mode, an error handler is to flush a data queue corresponding to the header queue, provide credits for transactions subsequent to the parity error, and set queue status signals for the data queue to a constant value. Credits can be returned, in response to the flush of the queue, to return credits corresponding to transactions flushed from the data queue.

In one example, the error containment mode includes handling pop requests and handle push requests.

In one example, an error reporter can be provided to log the parity error.

In one example, the error containment mode is to allow transactions pending at detection of the parity error to proceed prior to system shutdown.

One or more embodiments may provide an apparatus, a system, a machine readable storage, a machine readable medium, hardware- and/or software-based logic that include a root complex having a plurality of header queues and a plurality of payload data queues. Each queue corresponds to a respective transaction type, and the root complex is to detect a parity error in a header in a particular one of the header queues, generate fabricated header data for a plurality of fields of the header to replace data the plurality of fields to protect against an illegal value for at least one of the fields based on the parity error, and send a packet with the fabricated header data to another system component.

One or more embodiments may provide an apparatus, a system, a machine readable storage, a machine readable medium, hardware- and/or software-based logic that include one or more I/O devices and a root complex communicatively coupled to the one or more I/O devices. The root complex is to detect a parity error in a header in a particular one of the header queues, generate fabricated header data for one or more of fields of the header to indicate the parity error and replace data of one or more of the plurality of fields, cause an error containment mode to be entered, and send a packet including the fabricated header data to another system component. The root complex can further include the plurality of queues including input queues and output queues.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a root complex device comprising:
   parity error detector logic, implemented at least in part in hardware, to detect a parity error in a header, wherein the header is in a particular one of a plurality of queues, the header is to include a plurality of fields, and each of the queues is to correspond to a respective transaction type;
   header fabricator logic, implemented at least in part in hardware, to generate fabricated header data for one or more of the plurality of fields, wherein the fabricated header data is to indicate the parity error and replace data of one or more of the plurality of fields; and
   error handler logic, implemented at least in part in hardware, to enter an error containment mode based on the parity error.

2. The apparatus of claim 1, wherein at least a particular one of the fields is to be encoded with the fabricated header data to prevent an illegal value in the particular field.

3. The apparatus of claim 2, wherein the illegal value results from the parity error corrupting a value of the particular field.

4. The apparatus of claim 1, wherein the header comprises a header of a transaction layer packet.

5. The apparatus of claim 4, wherein the plurality of fields are to comprise a format field, a type field, a length field, an address field, a requester identifier field, and a tag field.

6. The apparatus of claim 5, wherein the fabricated header data is to comprise:
   for the format and type fields, values corresponding to a transaction type of the particular queue;
   for the length field, a first constant value; and
   for the address field, a second constant value outside of system address space;
   wherein values of the requester identifier field and the tag field are to be retained.

7. The apparatus of claim 6, wherein the parity error is to be identified based on the second constant value.

8. The apparatus of claim 5, wherein the plurality of fields are further to comprise a byte enable field and an error/poisoned field.

9. The apparatus of claim 8, the fabricated header data is to comprise:
   for the byte enable field, a third constant value; and
   for the error/poisoned field, a false value.

10. The apparatus of claim 1, wherein the fabricated header data is to maintain a value of at least a particular one of the plurality of fields.

11. The apparatus of claim 10, further comprising a filter to prevent escalation of errors resulting from fabricated header data in the particular field triggering an error at a downstream I/O device.

12. The apparatus of claim 1, wherein the particular queue comprises a header queue and, during the error containment mode, the error handler is to:
    flush a data queue corresponding to the header queue;
    provide credits for transactions subsequent to the parity error; and
    set queue status signals for the data queue to a constant value.

13. The apparatus of claim 12, wherein the error handler, during the error containment mode, is further to handle pop requests and handle push requests.

14. The apparatus of claim 12, wherein the error handler, in response to the flush of the queue, is to return credits corresponding to transactions flushed from the data queue.

15. The apparatus of claim 1, further comprising an error reporter to log the parity error.

16. The apparatus of claim 1, wherein the error containment mode is to allow transactions pending at detection of the parity error to proceed prior to system shutdown.

17. A method comprising:
    detecting, using root complex hardware, a parity error in a header, wherein the header is in a particular one of a plurality of header queues, the header is to include a plurality of fields, and each of the header queues corresponds to a respective one of a plurality of transaction types;
    generating, using the root complex hardware, fabricated header data for the plurality of fields, wherein the fabricated header data is to replace data of at least one field of the particular packet with dummy data; and
    entering an error containment mode based on the parity error.

* * * * *